(12) United States Patent
Beck et al.

(10) Patent No.: US 8,069,521 B2
(45) Date of Patent: Dec. 6, 2011

(54) HAND-HELD ELECTRICAL CONDUCTOR CLEANING APPARATUS

(75) Inventors: Alan D. Beck, Bow, NH (US); John D. Lefavour, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 1153 days.

(21) Appl. No.: 11/891,230

(22) Filed: Aug. 9, 2007

(65) Prior Publication Data

US 2009/0038090 A1 Feb. 12, 2009

(51) Int. Cl.
*A46B 13/02* (2006.01)
(52) U.S. Cl. ......................................... 15/88; 15/104.04
(58) Field of Classification Search ............ 15/88, 88.4, 15/104.04; D4/102
See application file for complete search history.

(56) References Cited

U.S. PATENT DOCUMENTS

| | | | |
|---|---|---|---|
| 2,887,702 A | 5/1955 | Freitag | |
| 2,858,555 A | 6/1955 | Medovick | |
| 3,116,811 A | 1/1964 | Stevenson | |
| 3,188,674 A * | 6/1965 | Hobbs | 15/179 |
| 3,343,192 A * | 9/1967 | Goldstein et al. | 15/23 |
| 3,407,431 A * | 10/1968 | Melnik | 15/344 |
| 3,447,177 A | 6/1969 | Williams et al. | |
| 3,621,505 A | 11/1971 | Vocker et al. | |
| 3,739,415 A | 6/1973 | Larson | |
| 3,903,561 A | 9/1975 | McCaslin | |
| 4,125,916 A | 11/1978 | King et al. | |
| 4,301,567 A | 11/1981 | Tucker | |
| 4,326,316 A | 4/1982 | Dolenti | |
| 4,734,950 A | 4/1988 | Schenke et al. | |
| 4,899,409 A * | 2/1990 | Cox, Jr. | 7/167 |
| 5,016,398 A | 5/1991 | Fukunaga | |
| 5,070,568 A * | 12/1991 | Wilcox et al. | 15/93.1 |
| 5,269,104 A * | 12/1993 | DiBiagio | 451/344 |
| 5,450,646 A * | 9/1995 | McHugh et al. | 15/22.1 |
| 6,983,508 B2 | 1/2006 | Saurer | |
| 6,990,707 B1 | 1/2006 | Haumann et al. | |
| D521,241 S * | 5/2006 | Dimmerling | D4/102 |
| D528,891 S | 9/2006 | Thompson et al. | |
| 2007/0033763 A1 | 2/2007 | Steinich | |

FOREIGN PATENT DOCUMENTS

| | | |
|---|---|---|
| JP | 06-000185 A | 1/1994 |
| KR | 10-2003-0045990 A | 6/2003 |
| KR | 10-2003-0083522 A | 10/2003 |

* cited by examiner

*Primary Examiner* — Randall Chin
(74) *Attorney, Agent, or Firm* — Harrington & Smith

(57) ABSTRACT

A hand-held electrical conductor cleaning apparatus including a frame having a handle section and a tube section; an abrasive member movably mounted in the tube section; a motor adapted to move the abrasive member inside the tube section; a battery connected to the motor; and a user control for actuating the motor.

22 Claims, 15 Drawing Sheets

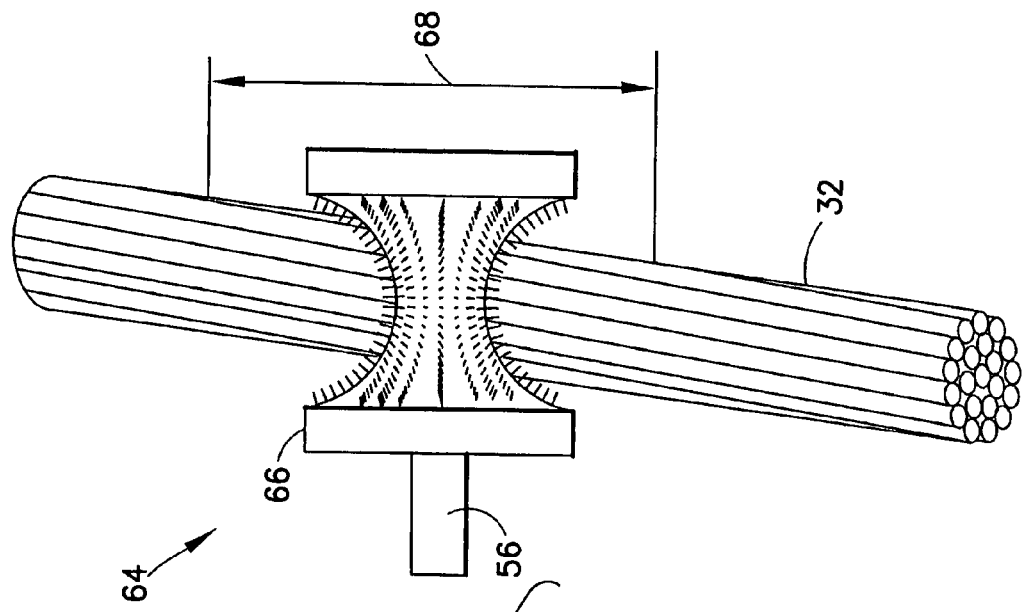
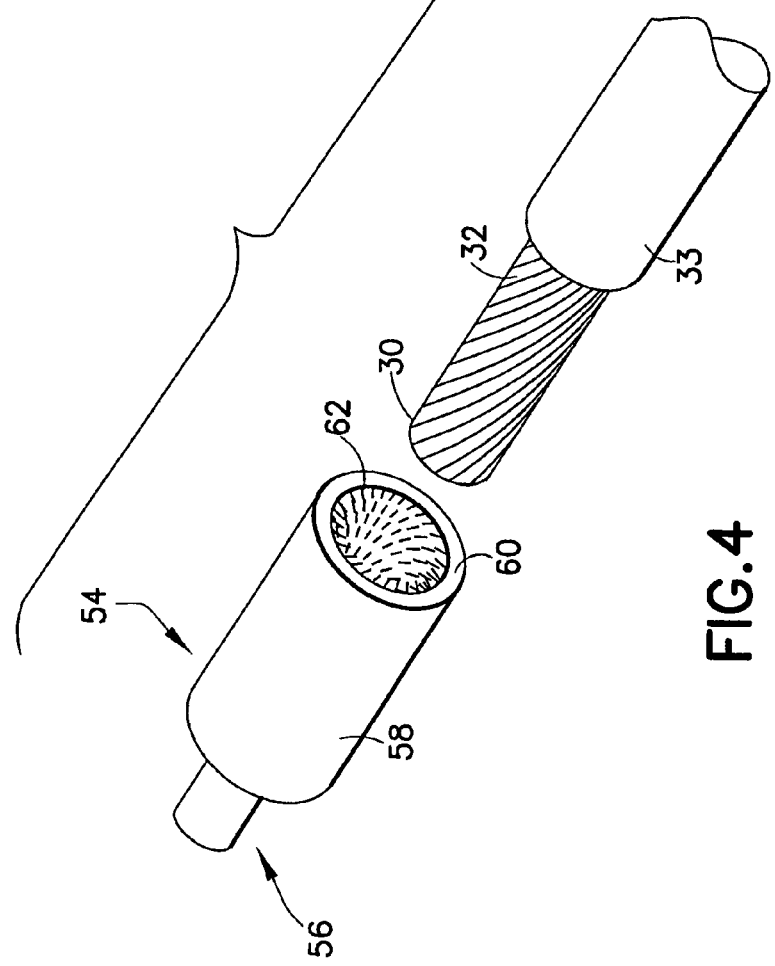

US 8,069,521 B2

HAND-HELD ELECTRICAL CONDUCTOR CLEANING APPARATUS

BACKGROUND OF THE INVENTION

1. Field of the Invention

The invention relates to an electrical conductor cleaner and, more particularly, to a hand-held motorized electrical conductor cleaner.

2. Brief Description of Prior Developments

U.S. Pat. No. 4,326,316 discloses a brush for cleaning an electrical conductor. U.S. Pat. No. 6,983,508 discloses a bolt cleaning system with bristles.

When installing electrical connectors onto an electrical conductor or ground rod it is important that the conductor or ground rod be cleaned to remove oxides, scale, or other contamination that may inhibit good electrical contact between the connector and the conductor or ground rod. In the past, this was done manually by hand, such as with an Emory cloth, or a hand-held manual wire brush, or with a chemical cleaner. However, these types of manual cleaning operations are time consuming.

SUMMARY OF THE INVENTION

In accordance with one aspect of the invention, a hand-held electrical conductor cleaning apparatus is provided including a frame having a handle section and a tube section; an abrasive member movably mounted in the tube section; a motor adapted to move the abrasive member inside the tube section; a battery connected to the motor; and a user control for actuating the motor.

In accordance with another aspect of the invention, a hand-held electrical conductor cleaning apparatus comprising a brush assembly and a drive handset. The brush assembly comprises a frame having a general clam-shell tube shape, and brush bristles in a center channel of the frame. The drive handset comprises a first section including a battery powered motor connected to a drive wheel, and a guide movably connected to the first section. The guide is adapted to press the brush assembly against the drive wheel.

In accordance with another aspect of the invention, a hand-held electrical conductor cleaning apparatus is provided comprising a frame comprising a handle section; a battery powered motor located in the frame; a rotatable brush connected to the motor; and a conductor guide assembly slidably connected to the frame. The conductor guide assembly comprises at least one roller adapted to guide a conductor against the rotatable brush.

In accordance with another aspect of the invention, a hand-held electrical conductor cleaning apparatus is provided comprising a frame comprising a handle section; a battery powered motor located in the frame; and a pair of conductor contacting wheels connected to the motor and adapted to be rotated in a same direction of rotation by the motor. The wheels form a conductor receiving area therebetween. At least one of the wheels comprises an abrasive wheel for removing material from the conductor.

In accordance with another aspect of the invention, a hand-held electrical conductor cleaning apparatus is provided comprising a frame comprising a handle section; jaws movably connected to the frame and configured to receive an electrical conductor therebetween, wherein at least one of the jaws comprises an abrasive surface for contacting the conductor; and a battery operated drive system connected to the frame. The drive system is configured to slide the jaws relative to each other to remove material from the conductor.

BRIEF DESCRIPTION OF THE DRAWINGS

The foregoing aspects and other features of the invention are explained in the following description, taken in connection with the accompanying drawings, wherein:

FIG. 4 is a perspective view of an alternate embodiment of the invention;

FIG. 5 is a view of another alternate embodiment of the invention;

DETAILED DESCRIPTION OF THE PREFERRED EMBODIMENTS

Figure 1:
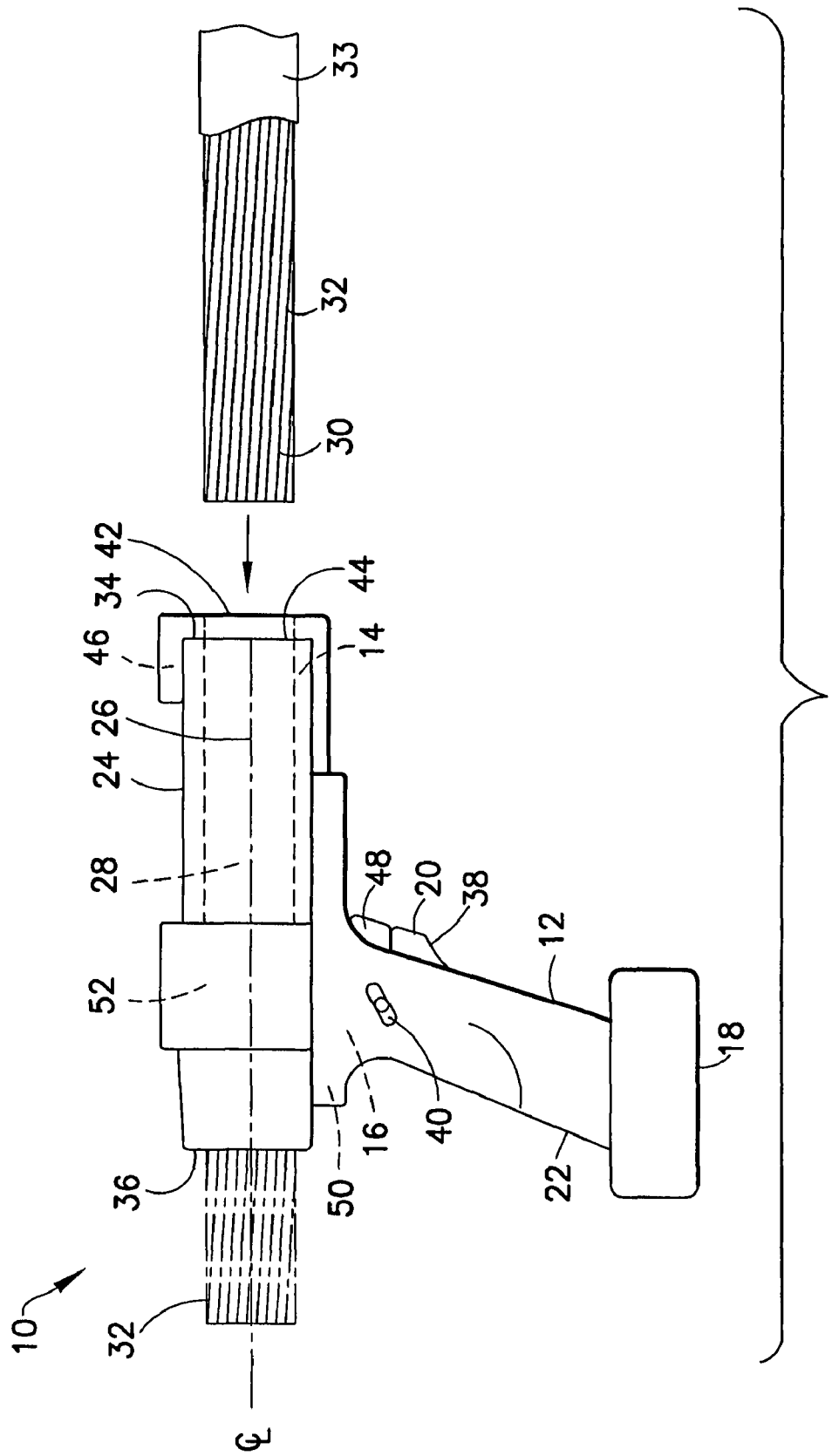
FIG. 1 is a side view of a tool comprising features of the invention.

Referring to FIG. 1, there is shown a perspective view of a tool 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

The tool 10 generally comprises a frame 12, at least one abrasive member 14, a motor 16, a battery 18 and a user control 20. The frame 12 includes a handle section 22. The handle section 22 in this embodiment has a general pistol grip shape. However, in alternate embodiments, other shapes of handles could be provided. The battery 18 is removably mounted to the bottom of the handle section 22. However, in alternate embodiments, the battery might not be removably mounted, or could be located at another location.

Figure 2:
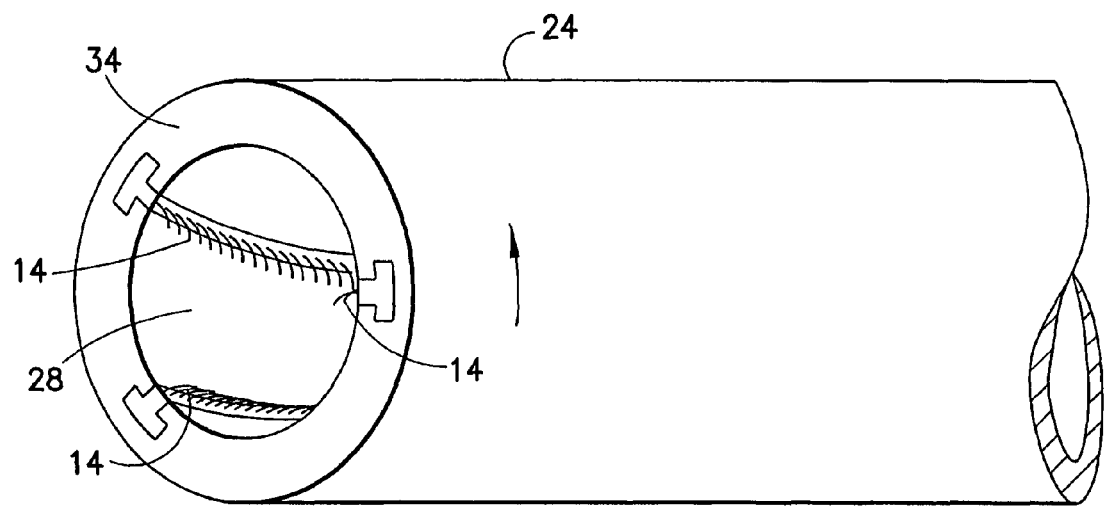
FIG. 2 is a perspective view of the front of the tool shown in FIG. 1 without the marker.
Figure 3:
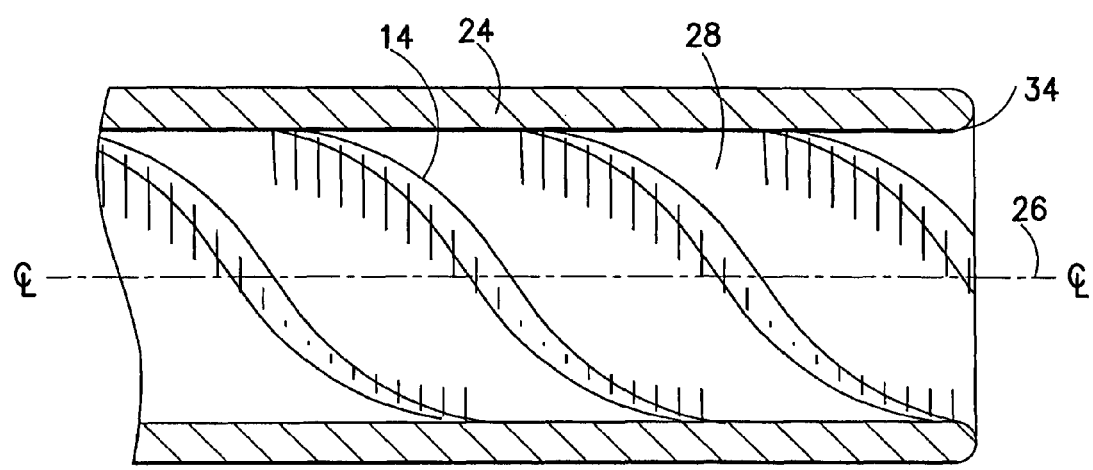
FIG. 3 is a cross sectional view of the front of the tool shown in FIG. 2.

Referring also to FIGS. 2 and 3, the at least one abrasive member 14, in this embodiment, comprises a plurality of wire brush bristles. In this embodiment the bristles 14 are mounted to a tube member 24. The tube member 24 is rotatably mounted to the top end of the handle section 22 for rotation about the center axis 26 of its center channel 28. The front end 34 of the tube member 24 is open to allow for insertion of the end 30 of the electrical conductor 32 into the tool 10. The insulation 33 has been previously removed from the strands of the conductor core. In this embodiment the rear end 36 of the tube member 24 is also open to allow the end 30 to pass through the tool; at least temporarily to allow cleaning of a relatively long length of the end 30. However, in an alternate embodiment the rear end 36 might not be open. The bristles 14 extend from the front end 34 towards the rear end 36 in a general helical pattern with the bristles extending radially inward towards the center axis of the channel 28. However, in alternate embodiments, other bristle patterns could be provided.

The motor 16 is adapted to axially rotate the tube member 24 relative to the handle section 22 about the center axis 26. In one type of embodiment the tube member 24 could be entirely housed in a section of the frame 12. However, in this embodiment the tube member 24 is substantially exposed. The user control 20 includes a trigger switch 38 which is connected to the battery 18 and the motor 16. The trigger switch 38 acts as an ON/OFF actuation switch for the tool. However, in alternate embodiments, any suitable type of ON/OFF actuation switch could be provided. The user control 20 also includes a forward/reverse switch 40 connected to the motor 16. However, in an alternate embodiment a forward/reverse switch might not be provided.

This embodiment comprises a battery powered rotary brush that contains a helical assembly of brushes. The brushes are contained in a tubular holder that, when activated, revolve in a rotary motion around the work piece 32. This concept is most applicable to applications such as terminal, splice or tap type connector applications. This design is relatively inexpensive and is similar in design to a pistol style drill, but adapted to a tubular brush holder. The device as shown also employs a forward/reverse switch to control the direction of brush rotation. It is desirable to have the direction of brush rotation match the lay direction of the conductor strands, otherwise conductor strands may try to unwind when brushed.

The device can also have a marker 42 that, once the brushing operation is complete, can be applied to indicate that the work piece 32 has been prepared properly prior to connector installation. There are a number of ways to achieve this and the preferred method is to apply a colored coating that is both electrically conductive yet protective of oxidation. The colored coating would serve as a visual indicator to an inspector that the conductor was properly prepared. The application of such a coating may be applied on demand by the operator by pushing the activate marker switch 48, or such a coating can be applied automatically, such as by a device that measures the electrically conductivity of the conductor before and after brushing for example. A microprocessor can compare the before and after conductivity measurements and, if an acceptable predetermined conductivity value is achieved, the color coating device could be automatically activated by the microprocessor.

In the embodiment shown in FIG. 1, the marker 42 comprises an applicator 44, connected to a fluid reservoir 46, and a trigger switch 48. The trigger switch 48 can be depressed by the user to activate the applicator 44. The marker 42 could also include a controller 50 and sensor 52 for automatic control as noted above.

As noted above, conventional cleaning of conductors can be time consuming. To address this issue several versions of a battery powered wire brush are illustrated. The versions shown in the drawings include a reciprocating brush design and rotary brush designs. There is also an interest in accessory type items that may be kitted and used in combination with virtually any off the shelf battery drill or impact wrench. Referring also to FIG. 4 an example of a rotary brush electrical conductor cleaning attachment 54 for a conventional drill or wrench is shown. The attachment 54 has a stem 56, such as a diameter, hex or other shape, which is configured to be received in an adjustable chuck of the drill or wrench. The main body 58 of the attachment forms a cylinder with an open front end 60, and wire brush bristles 62 inside the cylinder. The end 30 of the conductor 32 can be inserted into the open front end 60 for cleaning.

FIG. 5 shows another embodiment of a rotary brush electrical conductor cleaning attachment 64 for a conventional drill or wrench. In this embodiment the attachment 64 has a stem 56, such as a diameter, hex or other shape, which is configured to be received in an adjustable chuck of the drill or wrench. The main body 66 of the attachment has wire bristles or another abrasive surface which is provided in a shape forming a revolute concave surface. The concave shape is configured to receive the conductor 32. As the attachment 64 is rotated, it can remove debris and oxidation from the exterior of the conductor 32; which does not need to be the end 30 of the conductor. The area 68 to be cleaned could be a middle section of the conductor (with the insulation removed), such as for connection of a tap connector for example.

Figure 6:
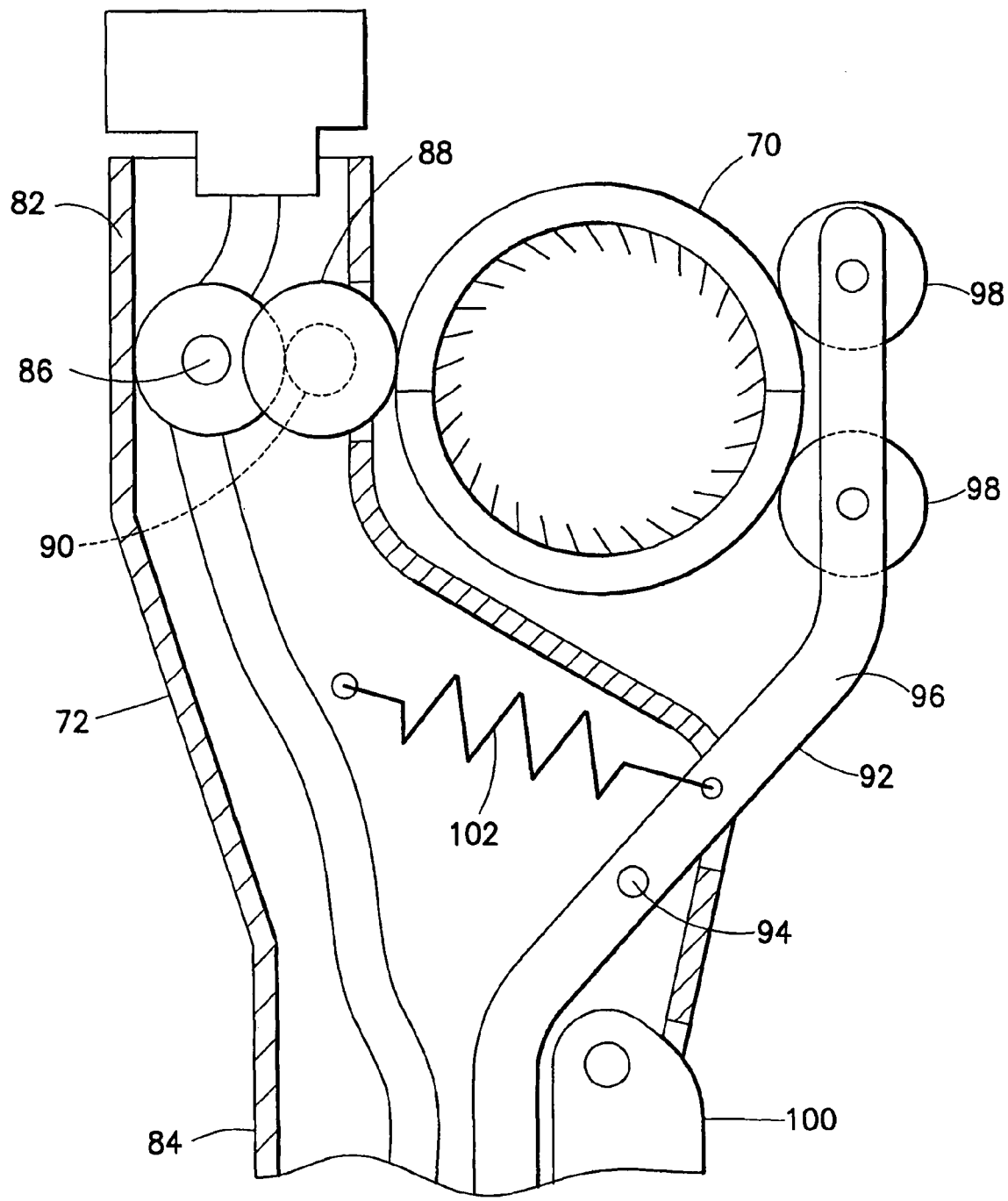
FIG. 6 is a cross sectional view of another embodiment of the invention.
Figure 7:
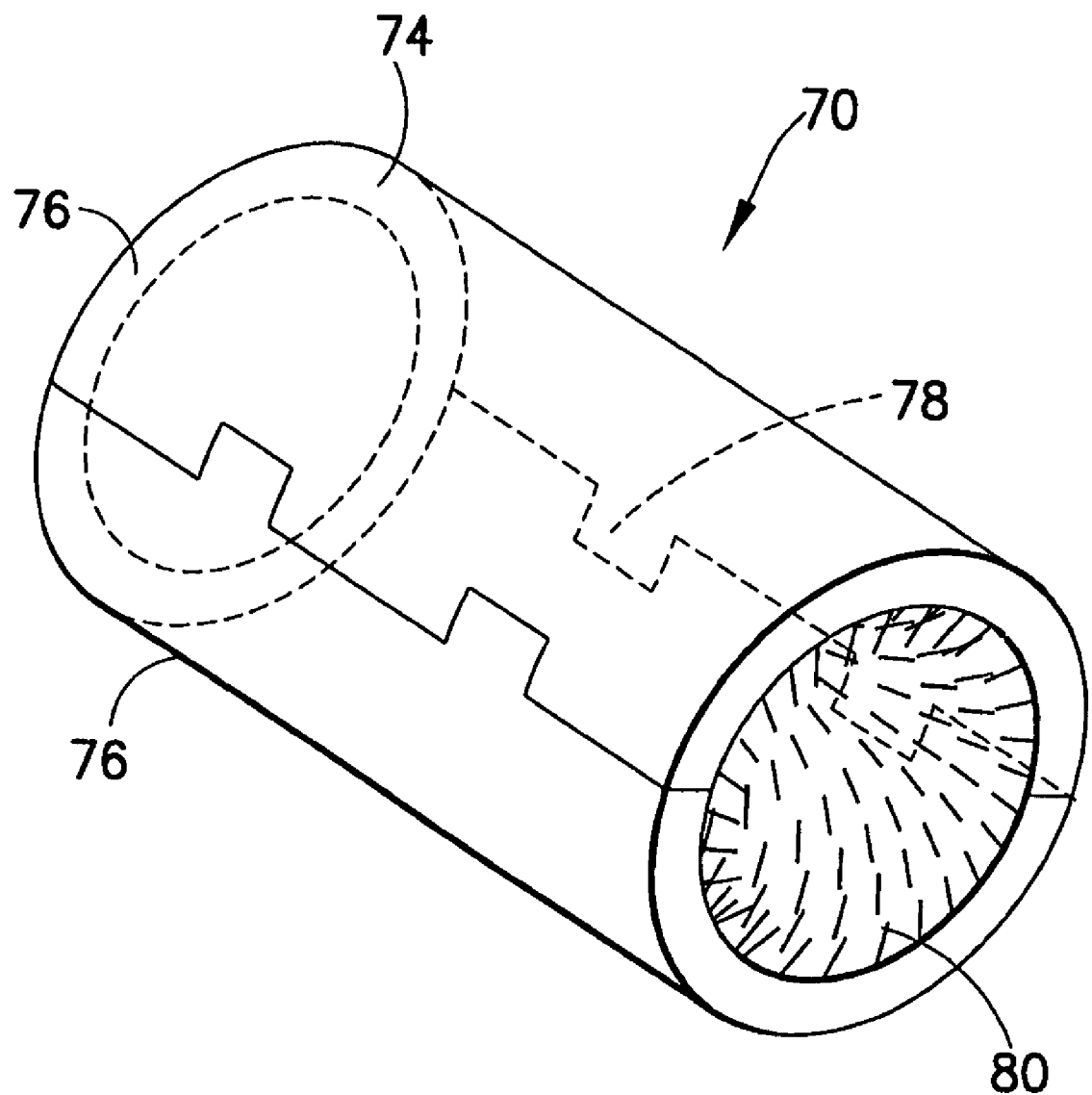
FIG. 7 is a perspective view of the brush assembly used with the tool shown in FIG. 6.

Referring also to FIGS. 6 and 7, yet another version is shown where a clam shell or hinged wire brush assembly 70 is placed around the conductor and is then rotated by a powering device 72. The assembly 70 has a frame 74 with multiple shell members 76 movably connected to each other, such as by a pivot 78. The members 76 can be latched together in a closed position to form a general tube shape. Wire bristles 80 are connected to the inside surfaces of the members 76.

The powering device 72 forms a drive handset with a first section 82 and a second handle section 84. The first section 82 includes a battery powered motor 86 connected to a drive wheel 88, such as by gears 90. The first section 82 also includes a guide 92 movably connected to the first section by a pivot 94. The guide 92, in this embodiment, includes a lever arm 96 and rollers 98. The device 72 has a trigger 100 which can be depressed to move the lever arm 96 and thereby move the rollers 98 in a direction away from the drive wheel 88. A spring 102 is provided to normally bias the lever arm 96 in a direction to bias the rollers 98 towards the drive wheel 88. The guide 92 is configured to press or clamp the assembly 70 against the drive wheel 88. As the drive wheel 88 is rotated by the motor 86 and gears 90, the drive wheel 88, such as a rubber wheel for example, is able to rotate the assembly 70. The engagement between the drive wheel 88 and the assembly 70 is frictional. However, in an alternate embodiment there could be a different kind of connection, such as intermeshing teeth for example. With this embodiment, the clam-shell configuration of the assembly 70 allows the assembly to be mounted to the conductor at locations other than its ends, and the device 72 can subsequently be attached to the assembly 70 for rotating the assembly relative to the conductor.

Figure 7A:
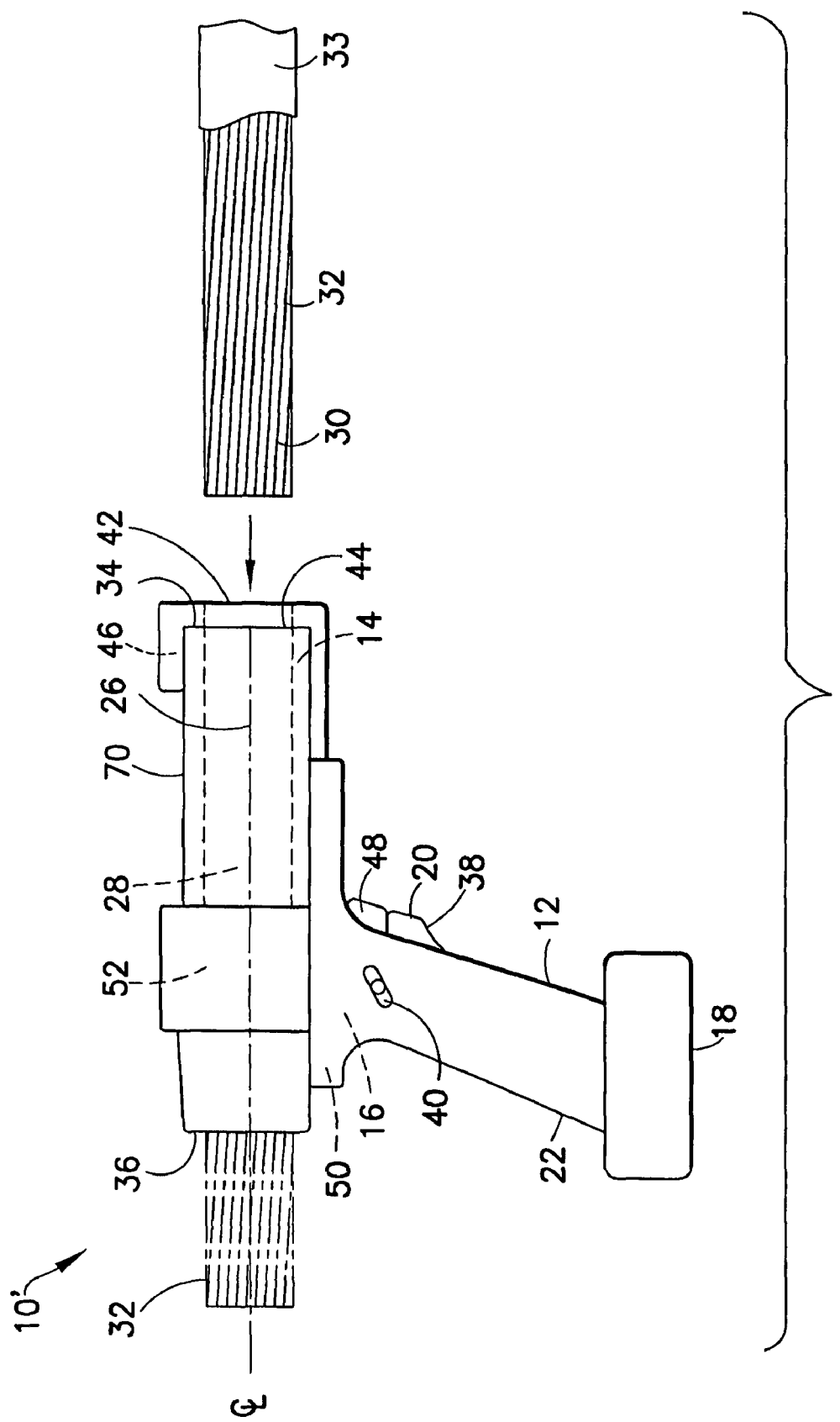
FIG. 7A is a side view of an alternate embodiment of the invention shown in FIG. 1.

The clam shell type of receiving area is not limited to the embodiment shown in FIGS. 6 and 7. The same numbers are used to indicate the same members as in FIG. 1, but alternative members could be provided. As illustrated by FIG. 7A, a portion of the frame of the device 10' can comprises the hinged assembly 70. As illustrated by this embodiment, features of the various embodiments can be combined in other different embodiments. The hinged assembly 70 replaces the tube member 24 shown in FIGS. 1-3. The hinged assembly 70 is rotatably mounted to the top end of the handle section 22 for rotation about the center axis 26 of its center channel 28. The hinged assembly 70 can be pivoted open to allow for insertion of the end 30 of the electrical conductor 32 into the tool 10'.

Figure 8:
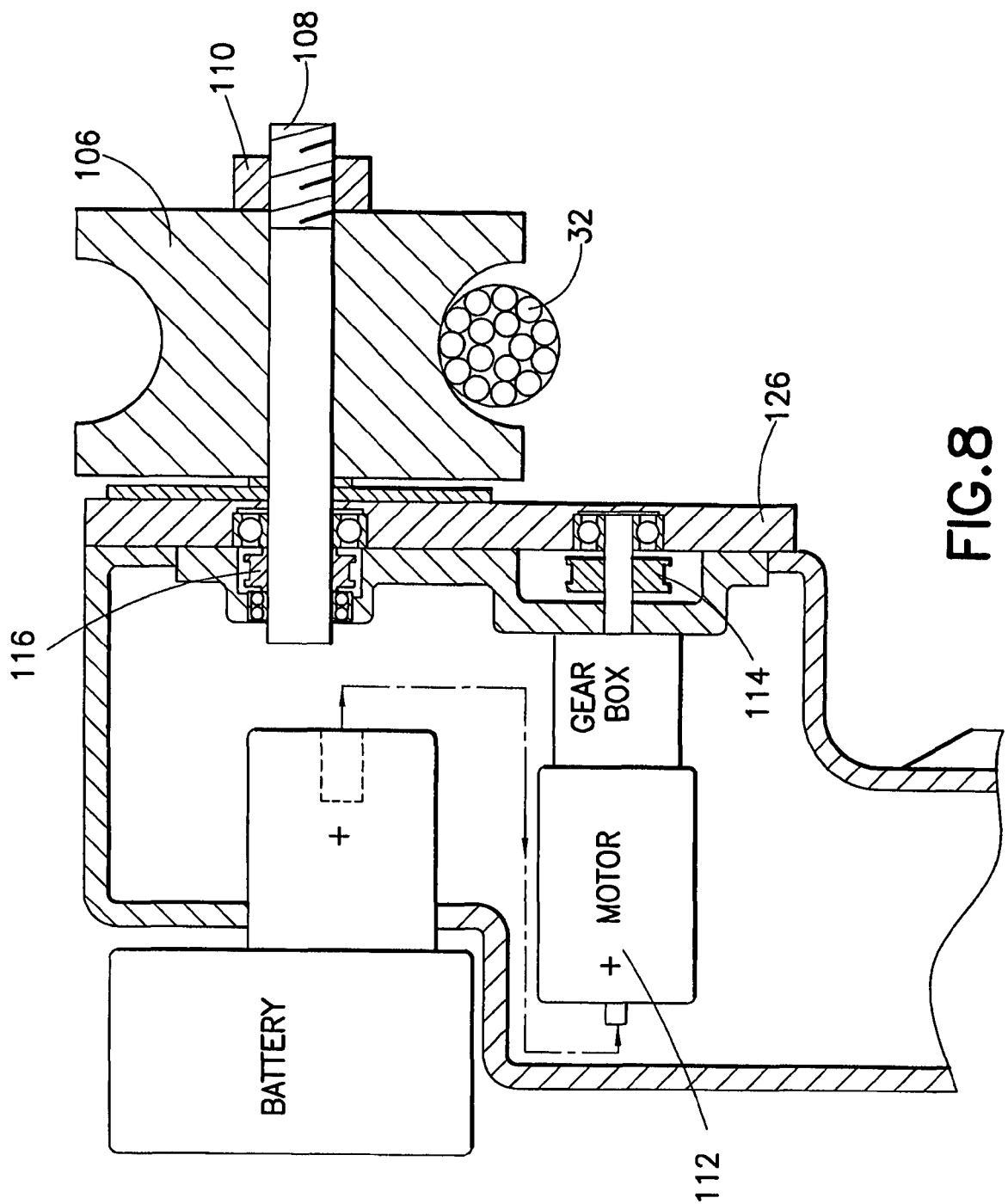
FIG. 8 is a cross sectional view of another embodiment of the invention.

Another rotary type brushing tool 104 is a dedicated battery platform that could be adapted to brushes as shown in FIG. 8 as a captured brush 106 via of a threaded shaft 108 and nut 110. This rotary brush 106 can be used on both continuous run conductor and conductor ends. As illustrated by this embodiment, there can be multiple drive configurations. The motor/gearbox 112 could be direct coupled to the brush shaft 108 or coupled to pulley 114. There could be a pulley or sprocket 116 on the brush shaft 108 for a belt or chain drive between the pulleys 114, 116. The motor could have a gear on the end of its shaft which could drive a gear on the brush shaft.

Figure 9:
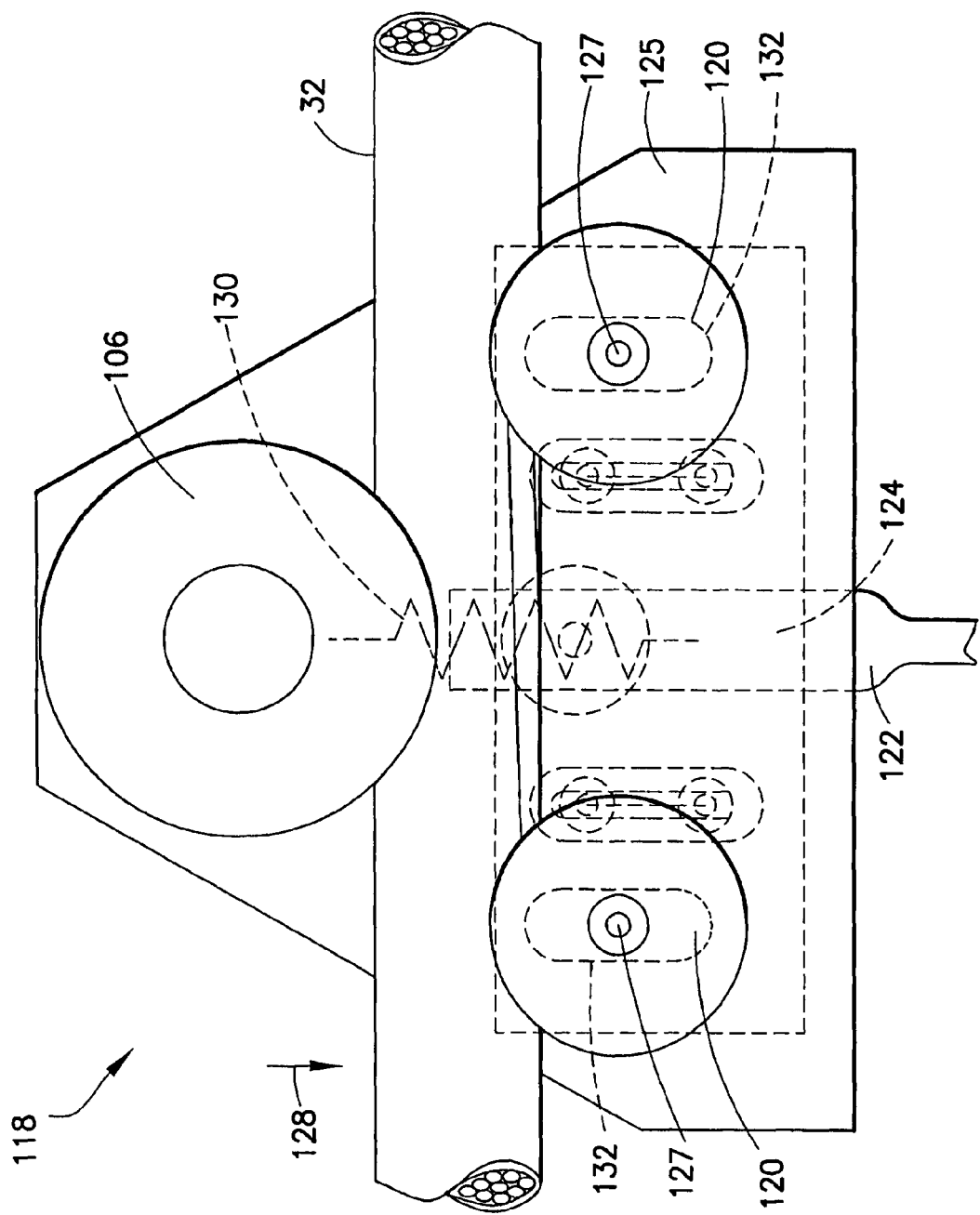
FIG. 9 is a partial view of another embodiment of the invention.

Yet another version of the tool is shown in FIG. 9. The tool 118 is identical to the tool shown in FIG. 8, but in this embodiment the tool 118 has two cable guide wheels 120 incorporated into the design. These wheels 120 offer stability from the torque that is generated while brushing on the non-end location of the conductor 32 by the motorized brush 106. The guide wheels 120 are movable and are spring biased to provide adequate clamping pressure between the brush 106, conductor 32 and guide wheels 120.

In this embodiment, the tool 118 has a slider plate 124 slidably mounted to the housing 126 shown in FIG. 8 and located behind a backer plate 125. The brush shaft 108 extends through the backer plate 125. The slider plate 124 is located between the housing 126 and the backer plate 125. The guide wheels 120 are rotatably mounted to the guide plate 124. Guide wheel shafts 127 extend through elongated holes 132 in the backer plate 125. The guide wheels 120 can be moved in a direction 128 away from the brushing wheel 106 so as to release the brushing tool from the conductor 32. To do this the lever 122 is activated and this pushes on the slider plate 124 and moves the guide wheels 120 in a direction away from the brush wheel 106. A spring 130 normally biases the slider plate 124 in a direction opposite direction 128 to capture the conductor between the guide wheels 120 and the brush 106.

Figure 10:
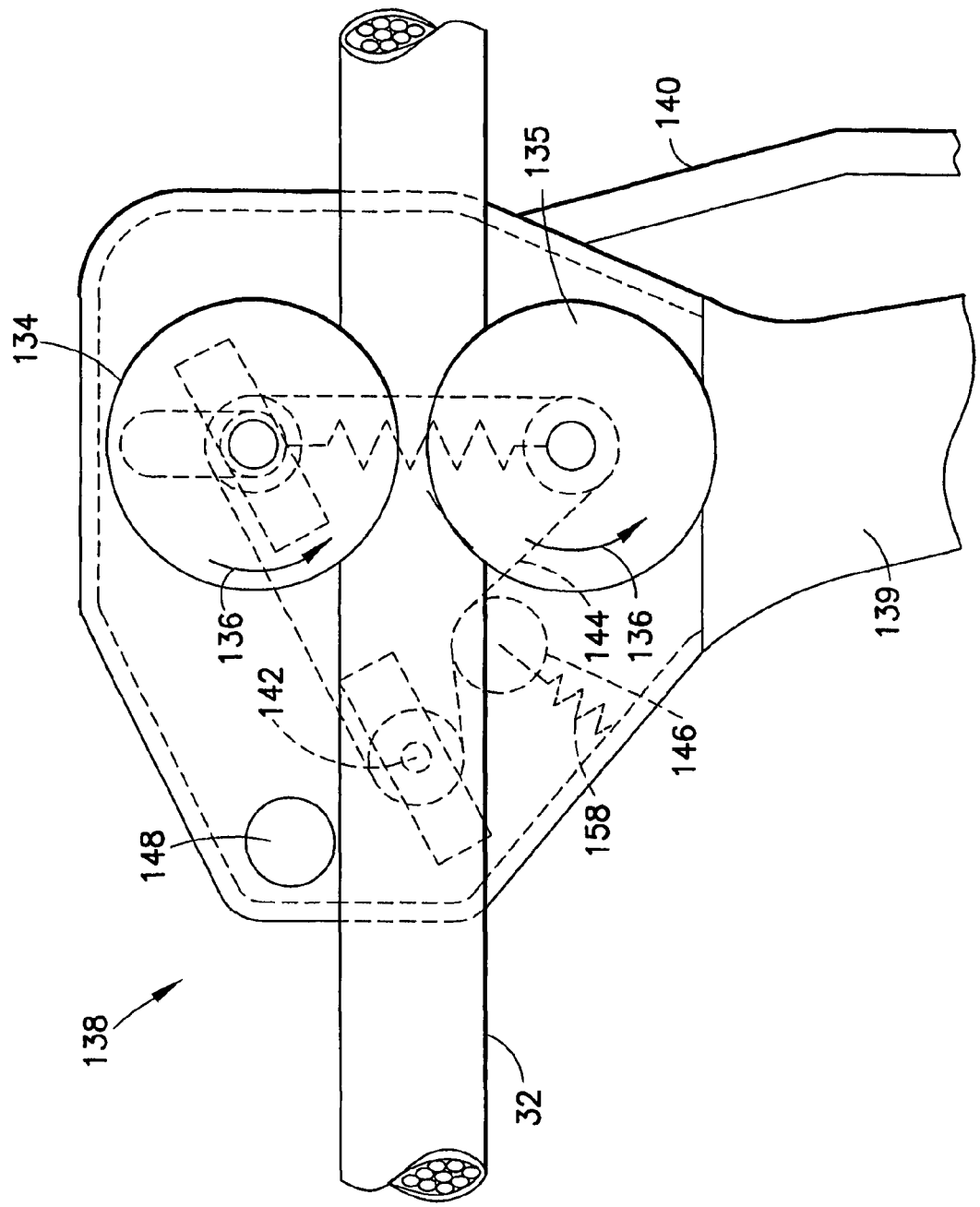
FIG. 10 is a side view of another embodiment of the invention.
Figure 12:
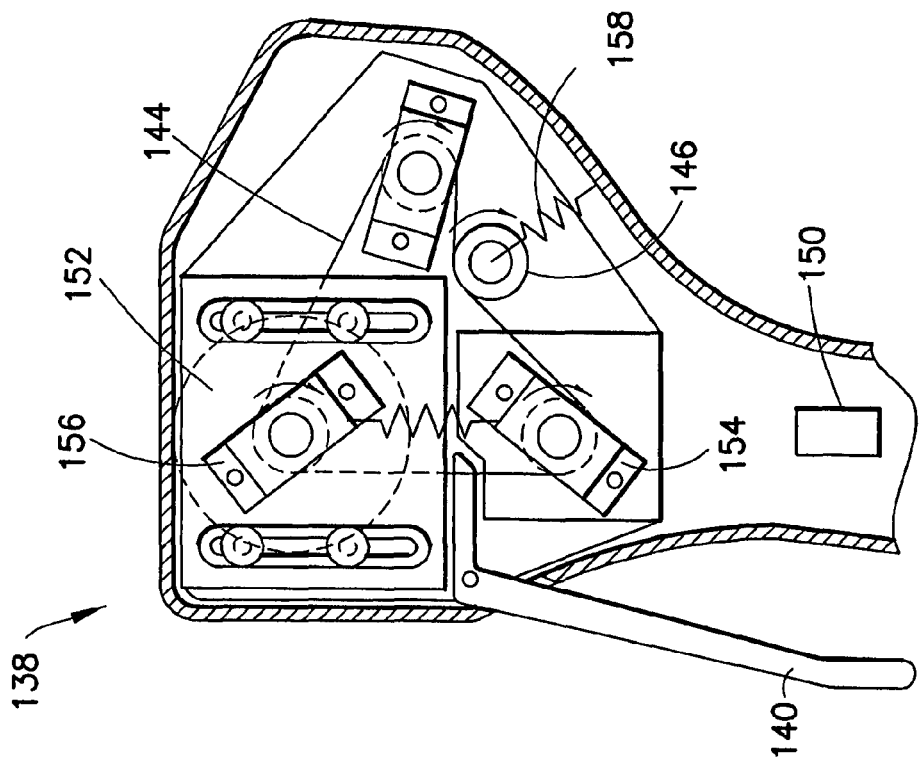
FIG. 12 is a cross sectional view of the embodiment shown in FIG. 10.
Figure 11:
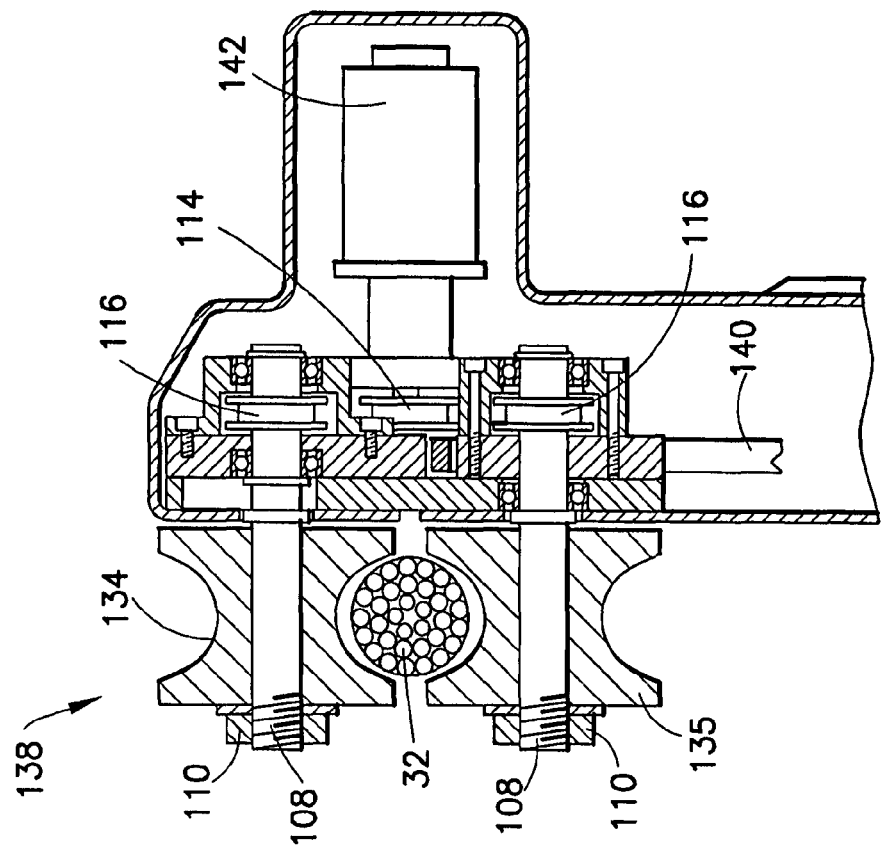
FIG. 11 is a cross sectional view of the embodiment shown in FIG. 10.

Yet another motorized rotary wire brushing tool is illustrated in FIGS. 10-12. This tool is a hand held tool with a handle section 139 and incorporates two brushing wheels 134, 135 that spin in the same direction 136 relative to each other. This minimizes the amount of effort required by the user to hold the tool 138 in place. If both wheels 134, 135 turned opposite to each other, then the brushing tool would want to traverse in a direction longitudinal to the axis of the conductor 32. Also, a guide wheel 148 can be employed to counteract grip handle rotation; rotation that is caused by torque forces which are produced during brushing. Once again a lever 140 is employed that pushes on a slider plate and can move at least one of the brush wheels in a direction away from the other brush wheel enabling the operator to remove the tool from, or place the tool onto a non-end location of a conductor. The wheels 134, 135 are powered by a battery powered motor 142 of the tool, and are preferably connected to each other by an adjustable transmission, such as a drive belt 144 and belt tensioner 146.

Some of the components in this embodiment, as seen in FIGS. 11-12, include an activation switch 150, a slider plate 152, a fixed bridge 154 connected to the bottom wheel 135 and a movable bridge 156 connected to the top wheel 134. The slider plate 152 is movable by the lever 140, and the belt tensioner spring 158. However, in alternate embodiments other components or shapes and sizes of components could be provided.

Figure 13:
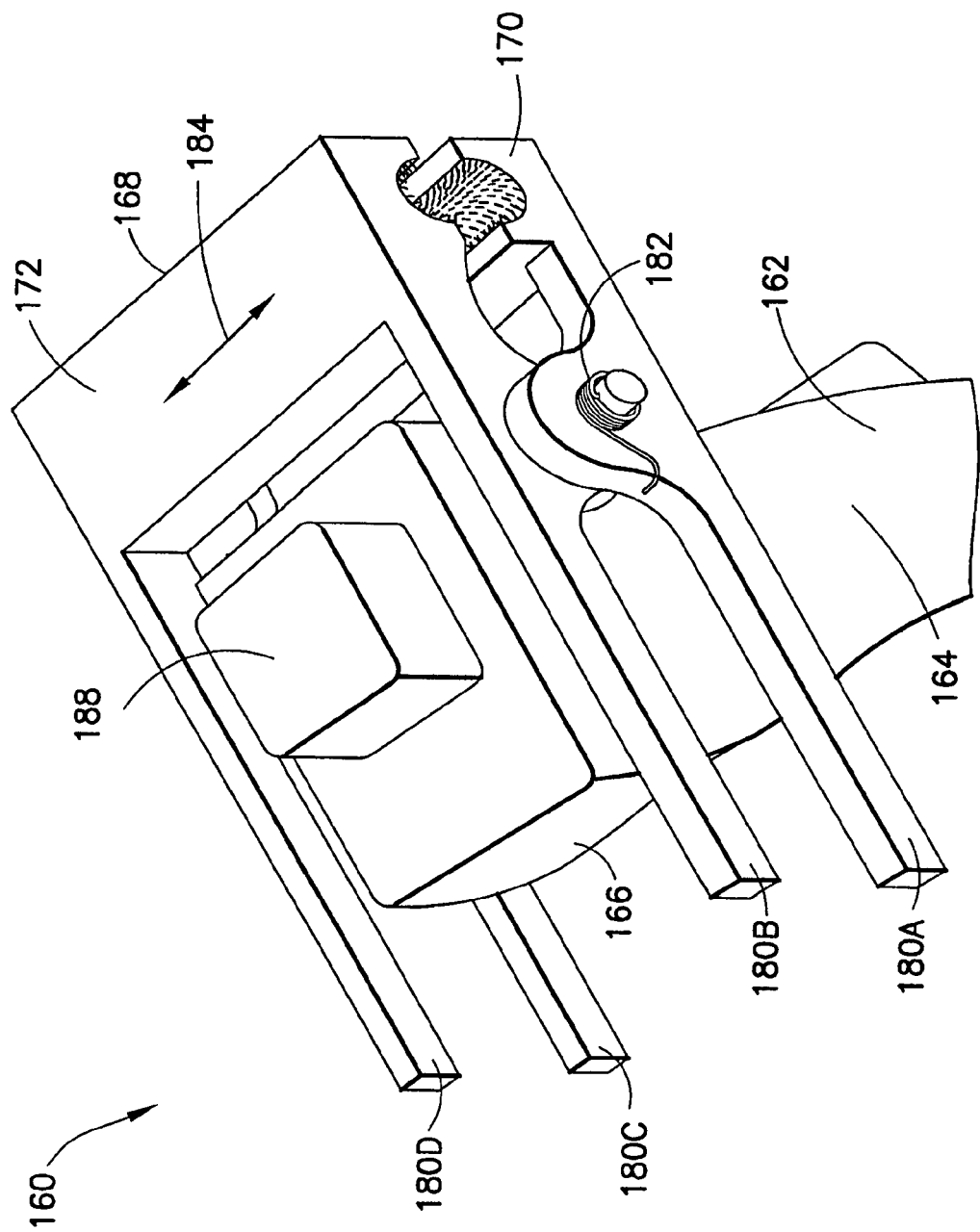
FIG. 13 is a perspective view of another embodiment of the invention.
Figure 14:
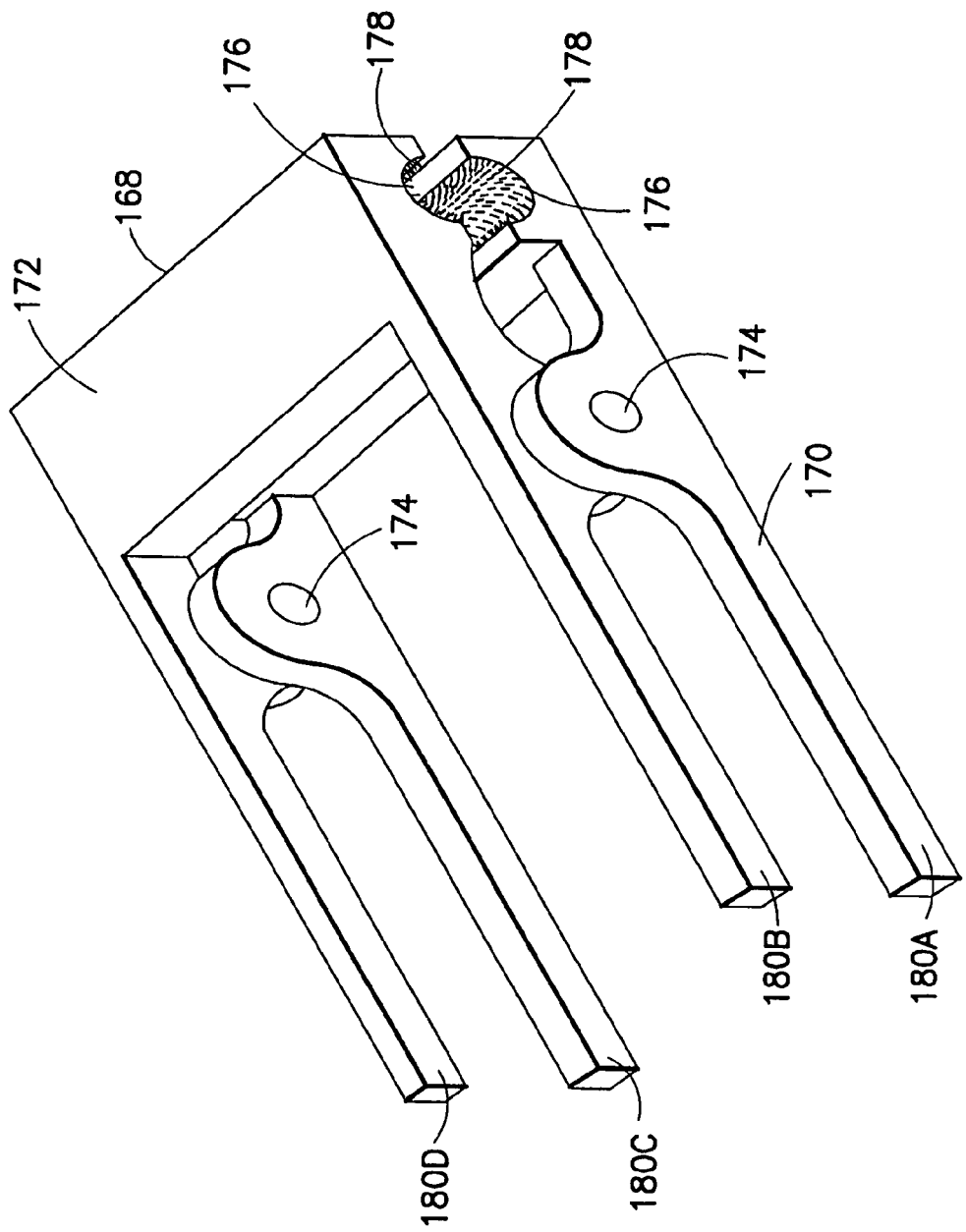
FIG. 14 is a perspective view of components of the embodiment shown in FIG. 13.
Figure 15:
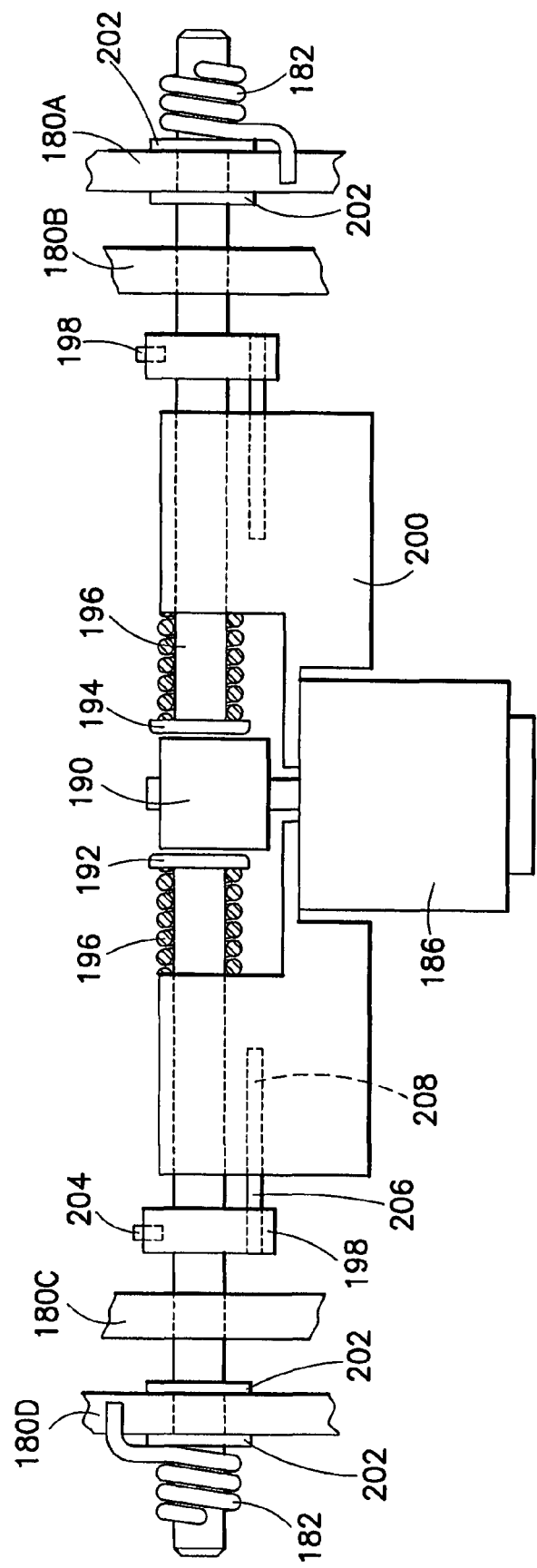
FIG. 15 is a diagram illustrating components of the embodiment shown in FIG. 13.

Another version of the tool is the shown in FIGS. 13-15. In this embodiment the tool 160 is a reciprocating wire brush tool. The tool 160 generally comprises a housing 162 having a handle section 164, a drive section 166, and jaws 168. As shown best in FIG. 14, the jaws 168 include a lower frame 170 and an upper frame 172. The frames 170, 172 are pivotably connected to each other at pivot sections 174. The front ends of the frames 170, 172 each have opposing conductor receiving channels 176 with abrasive, such as wire brush bristles 178. The abrasive 178 may be replaceable. The arms 180 of the frames 170, 172 can be pivoted towards each other to open the gap between the channels 176 to insert and remove the conductor 32 from the channels. As seen in FIG. 13, a torsion spring 182 can be provided to bias the front ends of the frames 170, 172 closed.

The drive section 166 is configured to translate the front ends of the frames 170, 172 relative to each other as indicated by arrow 184 in FIG. 13. The drive section 166 generally comprises a motor 186 powered by a battery 188, a cam 190 connected to an output shaft of the motor 186, two push rods 192, 194 connected to the arms 180D, 180A respectively, springs 196, and anti-rotation collars 198. The motor 186 is mounted in a fixed frame 200 of the housing 162. The push rods 192, 194 are slidably mounted in the fixed frame 200. The springs 196 bias inner ends of the push rods 192, 194 against the cam 190. The first arm 180A is locked in a longitudinal position on the push rod 194 by clips 202. One of the torsion springs 182 is attached on the end of the push rod 194 and to the first arm 180A as shown in FIG. 15. The fourth arm 180D is locked in a longitudinal position on the push rod 192 by clips 202. One of the torsion springs 182 is attached on the end of the push rod 192 and to the first arm 180D as shown in FIG. 15. The anti-rotation collars 198 are stationarily attached to the two push rods 192, 194 by set screws 204, and slidably attached to the fixed frame 200 by arms or sliding pins 206 located in holes 208.

As the motor 186 rotates the cam 190, the push rods 192, 194 are reciprocatingly moved inward and outward. This causes the two frames 170, 172 to laterally reciprocate as indicated by arrow 184. This motion allows the bristles 178 to scrub the conductor.

The embodiment shown in FIGS. 13-15 illustrates a battery powered wire brush for use on connectors and/or ground rods. There is often a need to remove oxides, scale and other contaminants that may inhibit a good connection. The brush shown provides reciprocating motion in a longitudinal direction relative to the work piece. When the reciprocating wire brush is activated, the electric motor can turn the cam. The cam has two opposing high lobes and two opposing low lobes. The cam is in direct contact with the two push rods that are compression spring biased against the cam.

As the cam high lobes contact the push rods the arms 180A, 180D are moved outward away from the cam. As the cam low lobes contact the push rods, the arms 180A, 180D are moved inward towards the cam. This inward and outward motion relative to the cam provides translation of the wire brush in the longitudinal direction relative to the work piece. This motion causes abrasion between the wire brush and the work piece. In addition, there are two torsion springs that bias the arms. The arms 180A, 180D each have a torsion spring affixed so as to provide clamping action between the upper and lower wire brushes onto the work piece. It should also be noted that each push rod shaft contains an anti rotation collar. The collar prevents the push rod from turning and negates the torsional force imparted on the push rod imposed by the torsion spring. It should also be noted that arm 180A is free to rotate but not translate relative to the mating push rod. Such constraints allow the arm 180 to rotate for opening and closing of the wire brush tool, however, also force arm 180A to translate with the mating push rod.

Arms 180A and 180C are extensions of the lower frame. Arm 180B located adjacent to arm 180A is an extension of the upper frame and is driven by arm 180D. Arm 180D is free to rotate but not translate relative to the mating push rod. Such constraints allow the arm 180D to rotate for opening and closing of the wire brush tool, however also force arm 180D to translate with the mating push rod.

The torsion spring affixed to each push rod cannot turn the push rod because the entire rotation collar prevents this motion. The torsion spring affixed to each push rod translates with its mating push rod and adjacent arm. Each anti-rotation collar prevents push rod rotation, but permits push rod translation. The advantage of a reciprocating wire brush is that it may be used on continuous run conductors or ends of conductors. The brush also functions equally as well regardless of wire lay direction. A linear or reciprocating brush is less likely to disturb the spiral wrapped lay then a rotary action brush. The brushing tool is easily removed from or attached to the work piece by pressing arms 180A, 180B together or arms 180C, 180D or a combination of both sets. The brushes are preferably removal and replaceable. Also, brushes of different shape contour and size may be employed.

Figure 16:
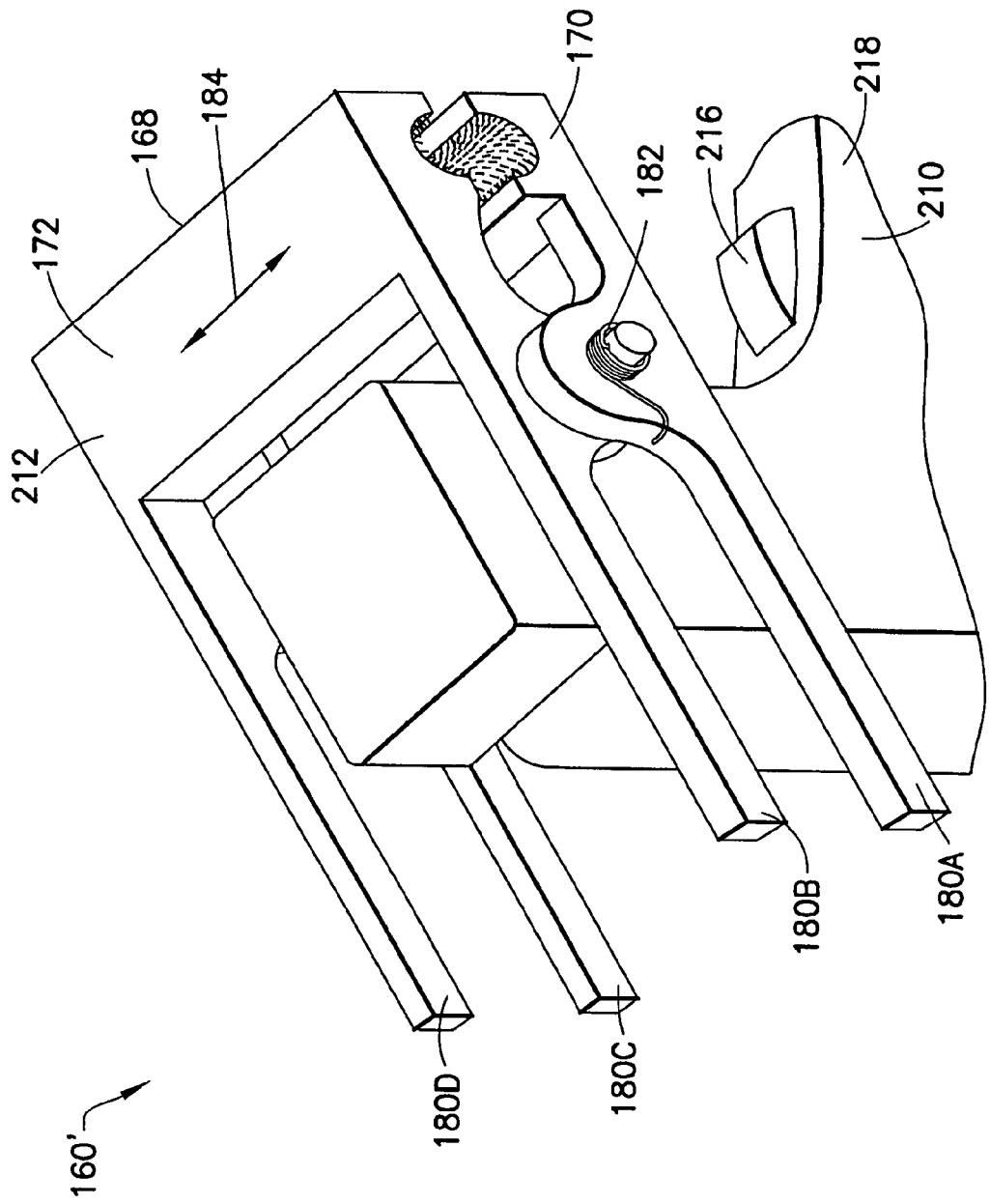
FIG. 16 is a perspective view of another embodiment of the invention.
Figure 17:
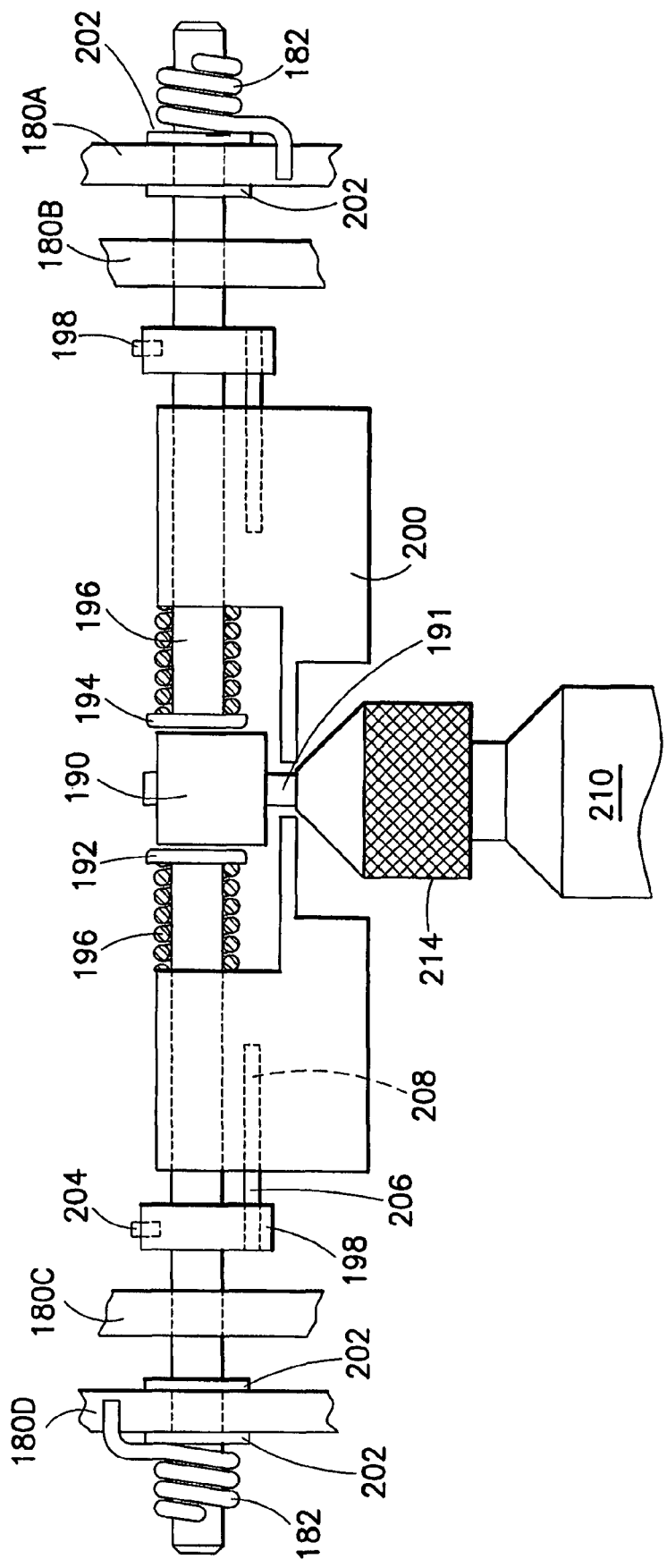
FIG. 17 is a diagram illustrating components of the embodiment shown in FIG. 16.

Referring also to FIGS. 16-17, an alternate embodiment of the tool of FIGS. 13-15 is shown. In this embodiment the tool 160' comprises a conventional electrically powered drill 210 and an attachment head 212. The same reference numbers are used to reference the same members as in FIGS. 13-15. However, in alternate embodiments, alternative members could be provided. The drill 210 has a chuck 214 which can be opened and closed onto a shaft as is well known in the drill art. The drill 210 has a trigger 216 on a handle section 218, also as is well known in the drill art. The attachment head 212 is identical to the working head shown in FIGS. 13-15, but does not comprise the attached motor 186 and battery 188. Instead, the shaft 191 of the cam 190 is configured to be inserted into the chuck 214 of the drill, such that the drill 210 can be used to drive the cam 190. Thus, features of the invention can be packaged into a working tool attachment for use with a tool, such as a conventional electric drill, which the user already has. The cost for the attachment head 212 can be less than the cost for the entire tool 160 of FIGS. 13-15.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications and variances which fall within the scope of the appended claims.

What is claimed is:

1. A hand-held electrical conductor cleaning apparatus comprising:
    a frame comprising a handle section;
    a tube section connected to the frame;
    an abrasive member located in the tube section;
    a motor adapted to move the abrasive member relative to the frame;
    a battery connected to the motor; and
    a user control for actuating the motor,
    where the tube section comprises shell members movably connected to each other between an open position and a closed position to allow an end of a conductor to be inserted or removed from the tube section.

2. A cleaning apparatus as in claim 1 wherein the handle section extends away from the tube section at an angle in a general pistol handle shape.

3. A cleaning apparatus as in claim 1 wherein the tube section comprises a front opening at a front end of the apparatus and a rear opening at a rear end of the apparatus.

4. A cleaning apparatus as in claim 1 wherein the apparatus has a general pistol profile.

5. A cleaning apparatus as in claim 1 wherein the abrasive member comprises brush bristles extending towards a central axis of the tube section.

6. A cleaning apparatus as in claim 5 wherein the brush bristles are arranged in a general helical pattern.

7. A cleaning apparatus as in claim 6 wherein the user control comprises a reverse direction switch.

8. A cleaning apparatus as in claim 7 wherein the user control comprises a trigger.

9. A cleaning apparatus as in claim 8 further comprising a marker for marking a section of an electrical conductor after the section has been cleaned.

10. A cleaning apparatus as in claim 9 wherein the marker comprises an electrically conductive colored indicator liquid which is placed on the section.

11. A cleaning apparatus as in claim 10 wherein the user control comprises a trigger to actuate the marker.

12. A cleaning apparatus as in claim 1 further comprising a marker for marking a section of an electrical conductor after the section has been cleaned.

13. A cleaning apparatus as in claim 12 wherein the marker comprises an electrically conductive colored indicator liquid which is placed on the section.

14. A cleaning apparatus as in claim 1 where the tube section is rotatably mounted on the frame to be rotated by the motor.

15. A cleaning apparatus as in claim 1 where the tube section comprises two of the shell members pivotably connected to each other in a general clam shell configuration.

16. A cleaning apparatus as in claim 1 where the tube section and abrasive member form a hinged wire brush assembly.

17. A hand-held electrical conductor cleaning apparatus comprising:
    a frame comprising a handle section;
    a tube section connected to the frame;
    an abrasive member located in the tube section;
    a motor adapted to move the abrasive member relative to the frame;
    a battery connected to the motor;
    a user control for actuating the motor; and
    a marker on the frame for marking a section of an electrical conductor after the section has been cleaned by the abrasive member.

18. A cleaning apparatus as in claim 17 where the tube section comprises shell members movably connected to each other between an open position and a closed position to allow an end of a conductor to be inserted or removed from the tube section.

19. A cleaning apparatus as in claim 18 where the tube section comprises two of the shell members pivotably connected to each other in a general clam shell configuration.

20. A cleaning apparatus as in claim 17 where the tube section and abrasive member form a hinged wire brush assembly.

21. A cleaning apparatus as in claim 17 where the tube section is rotatably mounted on the frame to be rotated by the motor.

22. A hand-held electrical conductor cleaning apparatus comprising:
- a frame;
- a hinged wire brush assembly connected to the frame, where the hinged wire brush assembly comprises a tube section and an abrasive member located in the tube section;
- a motor adapted to move the abrasive member relative to the frame;
- a battery connected to the motor; and
- a user control for actuating the motor,
- where the tube section comprises a shell member movably connected between an open position and a closed position to allow an end of a conductor to be inserted into or removed from the tube section.

* * * * *